Feb. 19, 1952          H. W. CRAM ET AL          2,586,007
WIRE COIL INSERT WITH TAPERED END
Filed March 20, 1947

INVENTORS.
HARKNESS W. CRAM
JOHN O. FORSTER
BY *Walter S. Aleston*
ATTORNEY.

Patented Feb. 19, 1952

2,586,007

UNITED STATES PATENT OFFICE 2,586,007

WIRE COIL INSERT WITH TAPERED END

Harkness W. Cram, Pelham, and John O. Forster, Long Island City, N. Y., assignors, by mesne assignments, to Heli-Coil Corporation, Long Island City, N. Y., a corporation of Delaware Application March 20, 1947, Serial No. 735,882

4 Claims. (Cl. 10—1)

The invention relates to wire coils of the type frequently used in screw connections where the coil with its outer portion is in engagement with an inner threading of a boss or nut member and, with its inner portion constitutes a female thread to be engaged by an exteriorly threaded screw member such as a stud or bolt. Certain drawbacks have been frequently encountered in such connections. When, at the start of the operation whereby the bolt or stud is screwed into the coil, insufficient care is taken to insure that the leading thread end of the bolt or stud exactly registers with the end of the thread groove formed by the coil, the free end of the coil wire or any corner occurring on the inner coil periphery tends to cut into the bolt or stud threading so as to damage the latter beyond repair. This danger prevails in particular when a power tool is used to drive the bolt or stud in.

The invention aims to minimize this danger by a special form of the coil end into which the bolt or stud is intended to enter. The invention consists in that at least one of the coil ends to be used as the entrance for the bolt or stud is shaped with a taper having an inner contour tangential in relation to the inner coil circumference and extending from a point of the latter substantially to the outer coil circumference. Thereby, each and any corner is avoided which otherwise might cut into the thread convolutions of the bolt or stud. It even can be attained that a portion of the bolt or stud threading in the rear of the leading convolution end engages a portion of the first coil convolution in the rear of its end before the actual ends of bolt and coil threading interengage. In consequence the so contacting portions will act as mutual guides so that the convolution ends can readily enter into the respective thread grooves.

Further objects and details of the invention will be apparent from the description given hereinafter and the accompanying drawing illustrating embodiments thereof by way of example.

Figure 1:
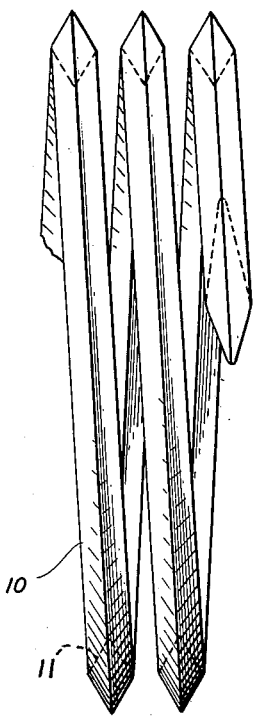
Fig. 1 is a side elevation of a coil insert according to the invention.
Figure 2:
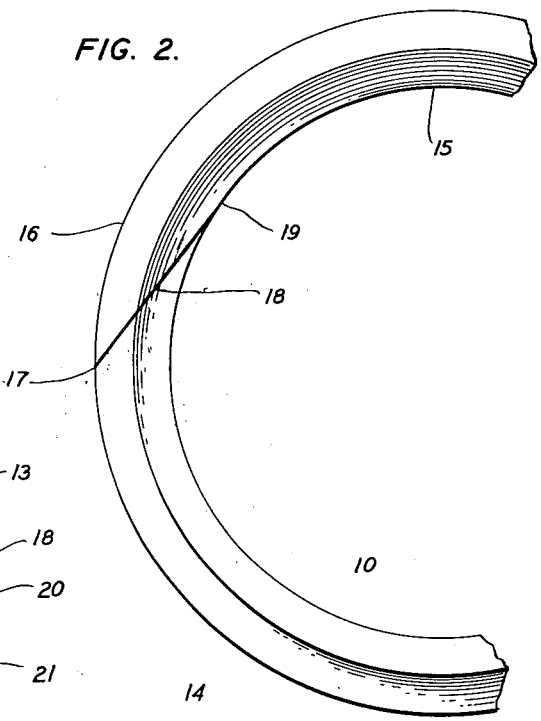
Fig. 2 is a front view thereof.
Figure 3:
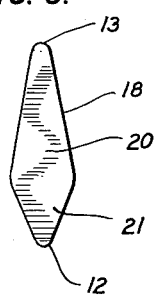
Fig. 3 is a plan view of the face of the coil end.

Referring now to the drawing, the coil 10 of which only an end portion is shown in Fig. 1, is of substantially diamond shaped wire cross-section as indicated at 11. This cross-section is selected for the illustrated example because it is the one most commonly used. However, it will be understood that the invention is applicable to coils of any desired cross-section be it round, square, pear-shaped or otherwise. As usual in coils of the illustrated type, the outer and inner peripheral edges of the diamond are slightly truncated, the truncations appearing more clearly in Fig. 3 at 12 and 13 respectively. The outer circumference 14 and the inner circumference 15 of the coil are visible in the front view of Fig. 2, where the coil end 16 appears as a taper having its point 17 located on the outer circumference 15 and being formed by a portion of the latter and a straight-line flank 18 which is tangential at point 19 with respect to the inner circumference 15 of the coil. Fig. 3 shows the face of flank 18, the plane of which is parallel to the coil axis and has substantially the shape of two truncated triangles erected in opposite directions on the same base, the height of the inner triangle 20 being larger than that of the outer 21. Other configurations of the end face may be obtained depending on the shape of the radial cross-section of the coil wire.

Figure 4:
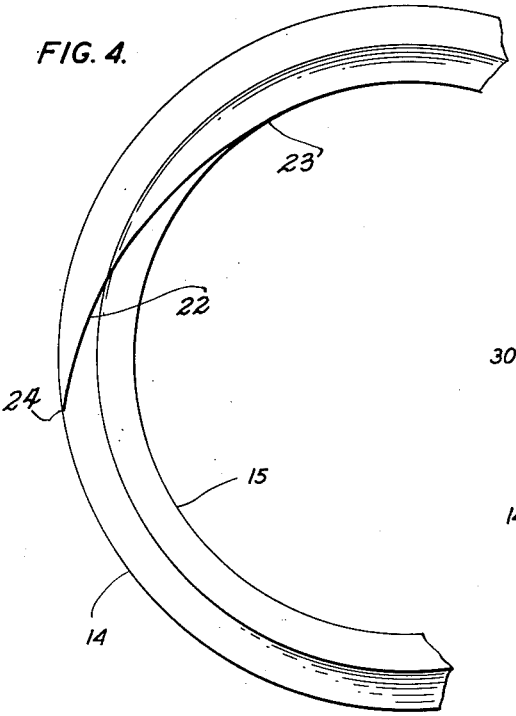
Fig. 4 is a front view of a modified coil end.

In order to attain the desired result it is not necessary that the inner flank of the tapered coil end be a straight line 18. However, it is imperative as stated above that the flank under consideration is tangential to the inner circumference of the coil. Fig. 4 shows, therefore, a modification wherein the inner flank 22 is an arc of a spiral tangential at point 23 with respect to the inner coil circumference 15 and of progressively increasing radial length so as to end at the point 24 of the outer coil circumference 14. This modified coil end also avoids any dangerous corner with which the threading of a bolt or stud might interfere during the screwing operation.

However, as the coil is made of wire and a cutting operation is required to shape the tapered end, the curved flank 22 is not quite so readily produced as the straight flank 18.

Figure 5:
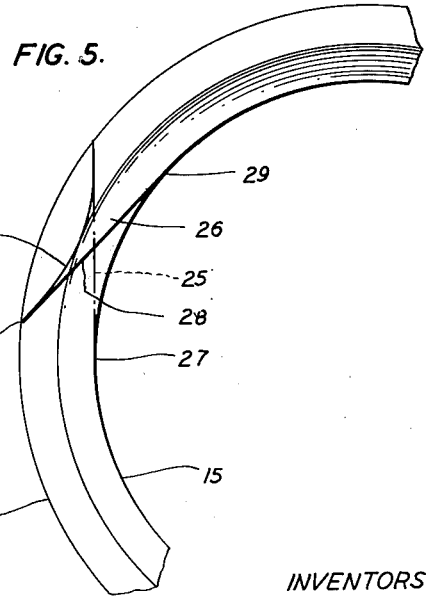
Fig. 5 is a front elevation of another embodiment of the invention.

In certain instances, the cutting operation on the inside of the taper may be undesirable as a burr may be caused which, though to a lesser degree than a corner on the inner coil circumference, might scratch or roughen the thread flanks of a bolt or stud screwed into the coil. In order to avoid such burrs on the inside of the coil, the tapered end can be produced by an outside cut, e. g. along the dotted line 25 in Fig. 5, so that the point of the taper 26 is originally located on the inner coil periphery at 27. Then, the taper is bent outward so that the inner flank 28 becomes substantially a straight line tangent to the inner coil circumference in point 29, and that the point of the taper is shifted to 30 on the outer circumference of the coil. In that event, the outer flank 31 of the taper will be concave substantially as shown.

It will be noted that cut line 25 is shown tangential to the inner coil periphery 15. This is not necessarily so. Since, however, it is advisable to make the taper as long as possible and as a tangent to the inner periphery furnishes the longest straight taper flank 28, the illustrated form is the preferred one.

Similarly, to what has been stated with regard to Fig. 4, it is not essential that the flank 28 be straight-lined when bent into its final position, meaning that it may be curved but it is necessary that it is a tangential continuation of the inner coil circumference, that the distances of its points intermediate the point of tangency and its outer end from the coil axis increase, and that there are no corners throughout its length. The actual curvature of the outer concave flank is also immaterial and may more or less differ from that shown, as it will depend on the deformation caused by bending the taper outward and will therefore also depend on the cross-section of the coiled wire. Furthermore, it is not necessary, and this is true too with respect to the embodiment of Figs. 1 to 3 and the modification of Fig. 4, that the taper point is located exactly on the outer periphery of the coil. However, it should be located at least so close to the outer periphery, if on the inside of the latter, that it projects safely into the female thread groove of a boss or nut member to which the coil may be applied. On the other hand, it should not project much beyond the outer coil periphery, as otherwise the coil might not be readily inserted. In addition to the mentioned advantages the structure according to the invention will have a certain locking effect inasmuch as the taper point on the outer periphery will tend to prevent a coil once inserted into a boss or nut member from being readily backed out. In that respect, the effect will be similar to that described e. g. in U. S. Patent No. 2,152,681, where an end taper is provided which, however, forms a corner with the inner coil periphery.

We claim:

1. In a wire coil, as an insert for screw connections, a taper of at least one end convolution of said coil, said taper having its point substantially on the outer coil circumference, and having its inner contour tangential to the inner coil circumference and a face in a surface parallel to the coil axis, the distance of said inner contour from the coil center increasing progressively from the point of tangency to the taper, and said face being concave and coincident with the outer contour of said taper.

2. A coil as claimed in claim 1 wherein the length of the inner contour is substantially equal to that of a tangent to the inner coil circumference between the point of tangency and the outer coil circumference.

3. A method of providing a wire coil with a tapered end having its point of taper on its outer circumference which comprises coiling a piece of wire to form a wire coil, cutting an end of the coil in a straight plane parallel to the coil axis and substantially tangential to the inner coil circumference, so as to form a taper having its point on said inner circumference and bending said taper outward until said taper point is located substantially on the outer coil circumference.

4. A method as claimed in claim 3 wherein during the bending operation the originally curved inner contour of the taper is straightened so as to be tangential to the inner coil circumference.

HARKNESS W. CRAM.
JOHN O. FORSTER.

REFERENCES CITED

The following references are of record in the file of this patent:

UNITED STATES PATENTS

| Number | Name | Date |
|---|---|---|
| 132,213 | Murray | Oct. 15, 1872 |
| 1,966,520 | Rayner | July 17, 1934 |